UNITED STATES PATENT OFFICE.

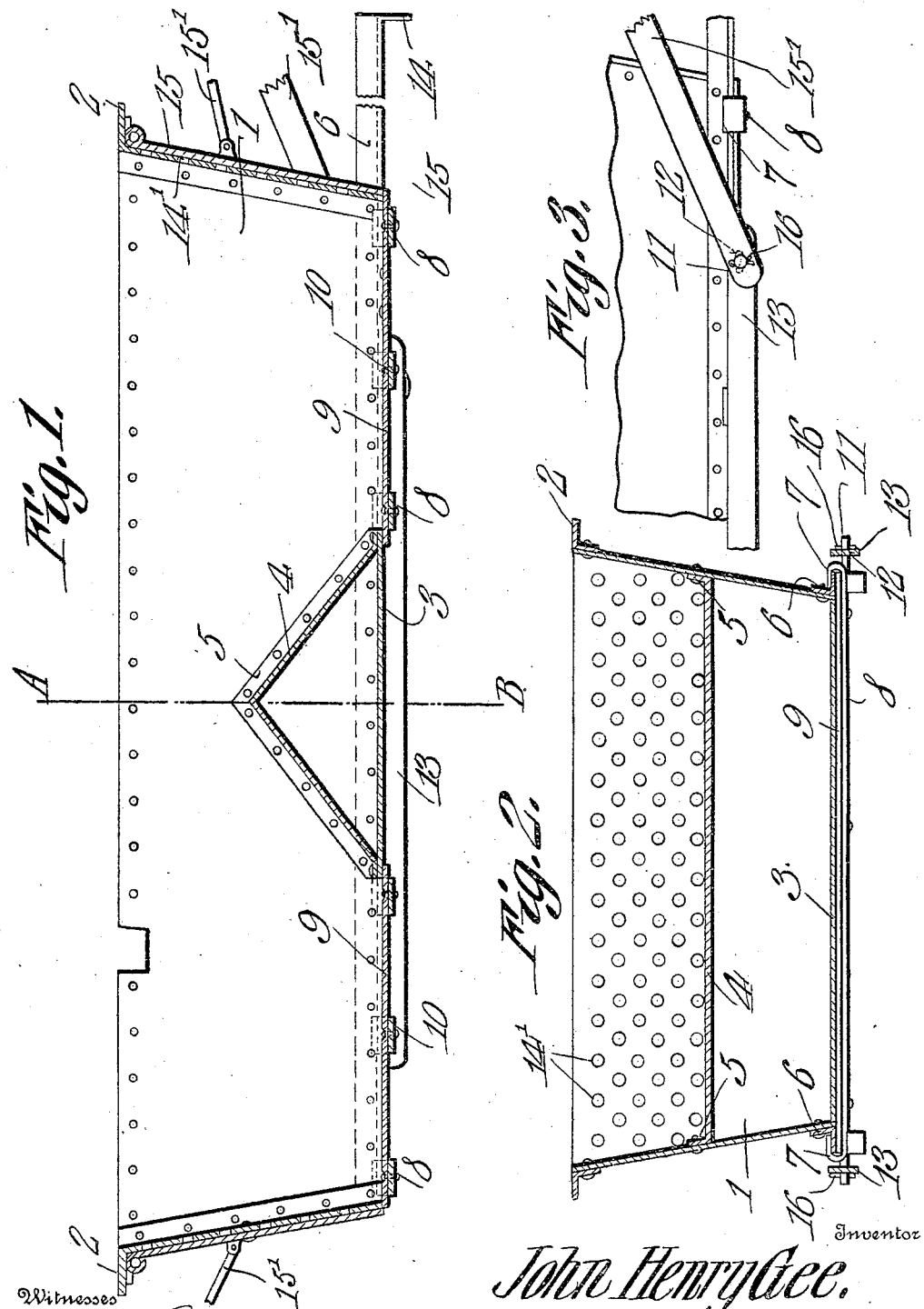

JOHN HENRY GEE, OF PALESTINE, TEXAS.

ASH-PAN FOR LOCOMOTIVES.

943,777. Specification of Letters Patent. Patented Dec. 21, 1909.

Application filed July 16, 1909. Serial No. 508,045.

*To all whom it may concern:*

Be it known that I, JOHN HENRY GEE, a citizen of the United States, residing at Palestine, in the county of Anderson and State of Texas, have invented a new and useful Ash-Pan for Locomotives, of which the following is a specification.

This invention relates to ash-pans for locomotives, its object being to provide a device of this character having a shiftable bottom which can be readily actuated from a point at one side of or above the deck of the locomotive.

A further object is to provide a pan the movable bottom of which is supported in a novel manner, said supporting means being located outside of the pan where they will not be affected by the heat of the contents of the pan or of the fire thereabove.

A further object is to provide a pan of this character, which can be readily manufactured and the end walls of which are so formed as to permit the draft to be readily regulated.

With these and other objects in view the invention consists in certain novel details of construction and combinations of parts hereinafter more fully described and pointed out in the claim.

In the accompanying drawings the preferred form of the invention has been shown.

In said drawings: Figure 1 is a central longitudinal section through an ash-pan embodying the present improvements. Fig. 2 is a section on line A—B Fig. 1. Fig. 3 is a side elevation of a portion of the pan.

Referring to the figures by characters of reference 1 designates the body of the ash-pan, the side and end walls thereof converging downwardly, and there being flanges 2 along the upper edges of the walls for the reception of bolts, rivets or other securing devices employed for fastening the pan to a supporting structure.

A transversely extending plate 3 is secured at the center of the bottom of the body 1, and disposed above this plate is an inverted V-shaped partition 4, preferably formed of heavy sheet metal, there being end flanges 5 upon this partition and which are secured to the side walls of the pan by means of rivets or the like, while the longitudinal lower edges of the partition are riveted or otherwise fastened to the corresponding edges of the plate 3. Angle-irons 6 are secured upon the outer faces of the side walls of the pan close to the bottom thereof, the bottom flanges of these irons being extended laterally to constitute guides for the hooked terminals 7 of cross-bars 8 secured in any preferred manner to the bottom face of a slide 9. Two of these slides are preferably utilized, each slide being provided with two or more bars 8, such as referred to, and each of the slides is of such size that when it is shifted in one direction it will close one of the openings formed between the partition 4 and the end walls of the pan body. Each of these slides 9 has an additional cross-bar 10 secured thereto, the ends of the bar projecting beyond the sides of the slide to constitute ears 11, which project through slots 12, formed in the end portions of connecting strips 13. One of these strips is located at each side of the pan, and the two strips serve to hold the slide 9 against independent movement. The guide rails formed by the angle-irons 6 project beyond one end wall of the pan 1 a distance slightly greater than the width of one of the slides 9, each of these rails being provided at its free end with a depending stop ear 14. One or more pitmen 15' may be pivotally connected to the ears 11 of one of the slides 9, these pitmen being actuated by any suitable mechanism located on the deck of the locomotive.

Each of the end walls of the pan body has a number of apertures 14' therein and a damper 15 is pivotally connected to each end wall of the pan body and is designed to normally close the apertures in the adjoining wall. Rods 15' may be provided for actuating those dampers from the deck of the locomotive or from a point at one side of said locomotive. Obviously by properly manipulating these dampers the draft created through the end walls of the pan can be regulated.

By mounting the slides 9 in the manner described it will be seen that both the supporting hooks 7 and the rails 6 are located outside of the pan where they will not be affected by the heat in or above the pan. By manipulating the rod 15 the two slides 9 can be shifted together so as to close or open the bottom of the pan and when they are shifted to open position one of the slides assumes a position beneath the plate 3 while the other slide moves on to the projecting portions of the rails 6 and against the stops 14. The ashes contained in the pan will thus be discharged through the openings, the partition 4 coöperating with the inclined end walls of the pan to form hoppers through which the ashes will fall by gravity.

As shown in Figs. 2 and 3 the connecting strips 13 may be held in engagement with the ears 11 in any preferred manner but preferably by means of cotter pins 16.

It is to be understood of course that more than two partitions 4 may be employed, if necessary, this number being dependent upon the length of the pan. It will be noted, too, that all of the slides move in unison into or out of closed position.

Obviously various changes may be made in the construction and arrangement of parts without departing from the spirit or sacrificing the advantages of the invention.

What is claimed is:

An ash pan including a body open at the bottom, L-shaped guide rails secured upon the sides of the body and extending beyond one end thereof the lower portions of said rails being disposed above the bottom of the body and each rail having a depending stop projection upon the projecting end thereof, spaced slides bearing upwardly against the bottom of the body and against the guide rails, supporting members extending transversely under the slides and having hooked terminals projecting upwardly therefrom and engaging the guide rails, the projections upon said rails extending into the path of the slides to limit the movement thereof in one direction, ears extending laterally beyond the slides, connecting devices detachably engaging the ears, and a pitman for actuating the slides.

In testimony that I claim the foregoing as my own, I have hereto affixed my signature in the presence of two witnesses.

JOHN HENRY GEE.

Witnesses:
R. C. SEWELL,
M. C. CAMPBELL.